United States Patent
Murthy et al.

(10) Patent No.: US 9,639,507 B2
(45) Date of Patent: May 2, 2017

(54) METHOD AND SYSTEM FOR PROVIDING A NET EFFECT PLATFORM FOR DEVELOPING AND CORRECTING SCREEN SCRAPING PARSER SCRIPTS

(71) Applicant: Intuit Inc., Mountain View, CA (US)

(72) Inventors: Vinay B V Murthy, Bangalore (IN); Servesh Pratap Singh, Bangalore (IN)

(73) Assignee: Intuit Inc., Mountain View, CA (US)

( * ) Notice: Subject to any disclaimer, the term of this patent is extended or adjusted under 35 U.S.C. 154(b) by 574 days.

(21) Appl. No.: 13/684,774

(22) Filed: Nov. 26, 2012

(65) Prior Publication Data

US 2014/0149842 A1    May 29, 2014

(51) Int. Cl.
| | | |
|---|---|---|
| G06F 17/00 | (2006.01) | |
| G06F 17/22 | (2006.01) | |
| G06F 9/44 | (2006.01) | |
| G06F 21/00 | (2013.01) | |

(52) U.S. Cl.
CPC ........ G06F 17/2247 (2013.01); G06F 9/4443 (2013.01); G06F 21/00 (2013.01)

(58) Field of Classification Search
CPC . G06F 17/2247; G06F 17/3061; G06F 17/243
See application file for complete search history.

(56) References Cited

U.S. PATENT DOCUMENTS

| | | | | |
|---|---|---|---|---|
| 6,014,702 A | * | 1/2000 | King et al. | 709/227 |
| 7,647,370 B1 | * | 1/2010 | Liu et al. | 709/203 |
| 8,788,935 B1 | * | 7/2014 | Hirsch | G06F 17/2247 715/234 |
| 8,799,515 B1 | * | 8/2014 | Wu | 709/246 |
| 2003/0110285 A1 | * | 6/2003 | Banerjee | G06F 17/2205 709/236 |
| 2003/0204460 A1 | * | 10/2003 | Robinson et al. | 705/35 |
| 2006/0095252 A1 | * | 5/2006 | Takagi | G06F 17/2247 704/200 |
| 2008/0208610 A1 | | 8/2008 | Thomas et al. | |
| 2009/0055522 A1 | | 2/2009 | Shen et al. | |
| 2009/0119268 A1 | | 5/2009 | Bandaru et al. | |
| 2010/0082773 A1 | * | 4/2010 | Liu | H04L 67/08 709/219 |
| 2011/0107321 A1 | | 5/2011 | Gough et al. | |
| 2012/0166977 A1 | * | 6/2012 | Demant et al. | 715/762 |
| 2012/0198558 A1 | * | 8/2012 | Liu et al. | 726/25 |

* cited by examiner

*Primary Examiner* — Stephen Hong
*Assistant Examiner* — Marshon Robinson
(74) *Attorney, Agent, or Firm* — Hawley Troxell Ennis & Hawley LLP; Philip McKay

(57) ABSTRACT

Individuals using a data management system are provided the capability to make corrections to default values presented in a simulation of at least part of a webpage including default data indicating the layout of the webpage, and/or one or more identified data fields determined by heuristic analysis and/or from data collected from other individuals/users. These contributing individual corrections are then transformed into contributing individual originated parser scripts associated with the webpage. The contributing individual originated parser scripts are then implemented and/or applied to the webpage for all individuals, including the contributing individual.

30 Claims, 5 Drawing Sheets

METHOD AND SYSTEM FOR PROVIDING A NET EFFECT PLATFORM FOR DEVELOPING AND CORRECTING SCREEN SCRAPING PARSER SCRIPTS

SUMMARY

In accordance with one embodiment, a method and system for providing a net effect platform for developing and correcting screen scraping parser scripts provides for screen scraping parser script development and correction/modification by the individuals using a data management system rather than the provider of the data management system.

In one embodiment, individuals using a data management system enter their login credentials associated with a given webpage. In one embodiment, an attempt is then made to access the webpage and/or obtain the data contained on the webpage. In one embodiment, if an error is encountered during the attempt to access the webpage and/or obtain the data contained on the webpage, the individual user is asked if they would like to help correct the issue. If the individual indicates they would like to help, the individual is designated a contributing individual and is provided a simulation of at least part of the webpage including default data indicating the layout of the webpage, and/or one or more identified data fields, derived by heuristic analysis and/or from data collected from other individuals/users.

In one embodiment, when the individual makes corrections to the default values presented in the simulation of the webpage, these corrections are obtained as contributing individual correction data for the webpage. In one embodiment, the contributing individual correction data for the webpage is then transformed into contributing individual originated parser scripts associated with the webpage. In one embodiment, the contributing individual originated parser scripts are then reviewed and/or approved. In one embodiment, the approved contributing individual originated parser scripts are then implemented and/or applied to the webpage for all individuals.

Figure 1:
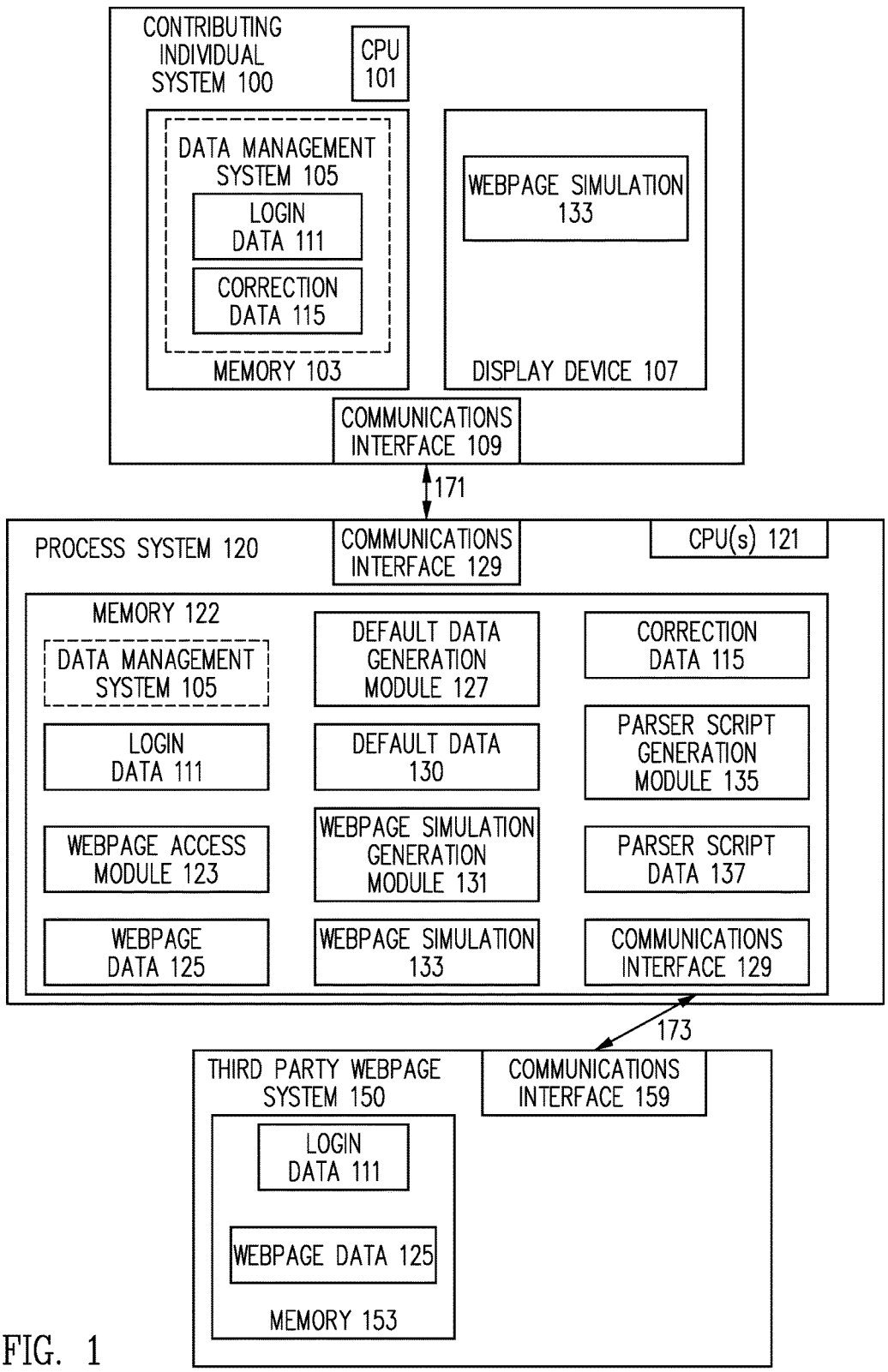
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a net effect platform for developing and correcting screen scraping scripts includes a process for providing a net effect platform for developing and correcting screen scraping scripts implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, the process for providing a net effect platform for developing and correcting screen scraping scripts is part of, linked to, or otherwise associated with, one or more data management systems used by one or more individuals.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides correction, and/or addition/modification data, representing an addition or correction to one or more default values presented in a simulation of at least part of a webpage.

Herein, a data management system can be, but is not limited to, any data management system implemented on a computing system and/or accessed through a network that processes data as discussed herein, and/or as known in the art at the time of filing, and/or as developed after the time of filing.

Herein, the term "data management system" can denote, but is not limited to, computing system implemented, and/or online, personal and/or business data management systems, packages, programs, modules, or applications; computing system implemented, and/or online, personal and/or business tax preparation systems, packages, programs, modules, or applications; computing system implemented, and/or online, personal and/or business accounting systems, packages, programs, modules, or applications; and various other personal and/or business electronic data management systems, packages, programs, modules, or applications, whether known at the time of filling or as developed later.

Many data management systems, such as, but not limited to, financial management systems, obtain data to process, such as but not limited to, financial transaction data, by scraping it off the webpages provided by various third parties, such as, but not limited to, financial institutions associated with a user.

To perform this screen scraping task, "scripts", also referred to herein interchangeably as "parser scripts" and "screen scraping parser scripts", must be created to access the third party webpage and data, i.e., to indicate where to enter the user's login credentials, and to map/identify the location/placement of data elements and/or data fields within the third party webpage, e.g., data fields containing passwords, user IDs, account numbers, dates, amounts, payees, etc. However, the parser scripts are prone to error because the third parties often change the look, feel, layout, and other aspects of the webpages they provide.

Currently, the process of correcting or adding parser scripts involves first an individual user identifying that the parser script is not working, often by the user noticing that certain data is not being obtained by the data management system. Then the individual user must contact the provider of the data management system who must determine if an actual error is present. Then once an error is identified by the provider of the data management system, a new or modified parser script must be created, and implemented, and distributed.

This current process of correcting the parser scripts through the provider of the data management system is a time consuming exercise and demands significant resources, and often significant delays. In addition, while the parser script is being corrected, the data cannot be obtained and the user is often aware of the resulting downtime. In addition, many parser script issues do not actually need a "formal" fix and such "non-fix" tickets affect the productivity, and use resources needlessly. Finally, any time it is desired to add a new webpage for access, a new parser script set must be created which is typically at least as time consuming a process as fixing existing script.

To address this issue, in one embodiment, individuals using a data management system are provided the capability to make corrections to default values presented in a simulation of at least part of a webpage, including default data indicating the layout of the webpage, and/or one or more identified data fields provided based on values determined by heuristic analysis and/or from data collected from other individuals/users. These contributing individual corrections are then transformed into contributing individual originated parser scripts associated with the webpage. The contributing individual originated parser scripts are then reviewed/approved, and, once approved, are implemented and/or applied by the data management system to access, and/or obtain data from, the webpage for all individuals, including the contributing individual.

In one embodiment, a data management system is provided to one or more individuals. In one embodiment, the provided data management system is any data management system as discussed herein, and/or as known in the art at the time of filing, and/or as developed after the time of filing.

In one embodiment, each of the one or more individuals utilizes their own implementation of the provided data management system. In some embodiments, the individuals access their implementation of the provided data management system from a server computing system and/or a network or cloud. In some embodiments, the individuals run, and access, their implementation of the provided data management system on their own local computing system. In some embodiments, the individuals access their implementation of the provided data management system from a webpage or any other network discussed herein, and/or as known in the art at the time of filing, and/or as developed after the time of filing.

In one embodiment, the provided data management system includes, is a parent system for, or is otherwise associated with, the process for providing a net effect platform for developing and correcting screen scraping scripts.

In one embodiment, an individual, i.e., a user of the data management system, provides data representing their login credentials for a third party webpage to the provider of the data management system. As noted above, data management systems, such as, but not limited to, financial management systems, obtain data to process, such as but not limited to, financial transaction data, by scraping it off the webpages provided by various third parties, such as, but not limited to, financial institutions associated with a user.

To perform this screen scraping task, the user provides his or her login credentials, such as but not limited to, the individual's user name, password, account number, etc. for the webpage.

In one embodiment, the individual provides the data representing their login credentials for the third party webpage to the provider of the data management system through a user interface screen provided through the data management system using any user interface device, as discussed herein, and/or as known in the art at the time of filing, and/or as developed after the time of filing.

In one embodiment, the individual provides the data representing their login credentials for a third party webpage through one or more computing systems and/or network locations; e-mail; text message; POTS; or any other method, means, mechanism, process or procedure for transferring data discussed herein, and/or as known/available in the art at the time of filing, and/or as developed/made available after the time of filing.

In one embodiment, once the data representing the individual's login credentials for a third party webpage is obtained, the data management system attempts to access the third party webpage and/or obtain various desired data from the third party webpage associated with the individual.

As noted above, the data management system typically creates, maintains, and uses "scripts", also referred to herein interchangeably as "parser scripts" and "screen scraping parser scripts", to, along with the individual's login credential data, access the individual's accounts and data on the third party webpage. As also discussed above, the parser scripts typically are used to indicate where to enter the user's login credentials, and to map/identify the location/placement of data elements and/or data fields within the third party webpage, e.g., data fields containing passwords, user IDs, account numbers, dates, amounts, payees, etc.

As also noted above, screen scraping parser scripts are prone to error because the third parties often change the look, feel, layout, and other aspects of the webpages they provide. In one embodiment, when the data management system attempts to access the third party webpage and/or obtain various desired data from the third party webpage associated with the individual, an error occurs and all, or part, of the desired access and data either fails or is not obtained.

In one embodiment, once the error is identified, e.g., access is not obtained, or the desired data is not obtained, or made available for processing, the individual is contacted and asked if they would like to participate in identifying and correcting the issue that caused the error. In one embodiment, if the individual indicates they would like to help, the individual is designated a contributing individual.

In one embodiment, a simulated website/webpage, e.g., a simulation, or mock-up, of at least part of the webpage associated with the attempted access and error, is generated and provided to the contributing individual. In one embodiment, the simulated website/webpage is provided to the contributing individual through a user interface screen provided by the data management system on a display device of a contributor computing system implementing, or accessing, at least part of the data management system.

In one embodiment, the simulated website/webpage includes data representing at least part of the webpage including default data indicating the layout of the webpage, and/or one or more identified data fields, provided as default data.

In one embodiment, the default data is determined based on heuristic analysis and data provided by other users of the data management system. For instance, as a specific illustrative example, if in a threshold number of instances, data indicates that a nine digit number after the text "account number" is the account number, then as a default, a nine digit number after the text "account number" is identified in the simulated website/webpage as the account number or account number field.

As another specific illustrative example, if in a threshold number of instances, data indicates data in tables with double borders contain financial transaction amounts, then as a default, data in tables with double borders is identified in the simulated website/webpage as the transaction amount, or transaction amount field.

In one embodiment, the simulated website/webpage is provided to the contributing individual as an interactive Graphical User Interface (GUI) through which the contributing individual can add, modify, correct, and/or rearrange the default data in the simulated website/webpage.

In one embodiment, the contributing individual adds, modifies, corrects, and/or rearranges the default data in the simulated website/webpage. In one embodiment, the contributing individual adds, modifies, corrects, and/or rearranges the default data in the simulated website/webpage through a user interface screen provided by the data management system on a display device of a contributor computing system implementing, or accessing, at least part of the data management system.

In one embodiment, the contributing individual's additions, modifications, corrections, and/or rearrangements of the default data in the simulated website/webpage are transformed into contributing individual correction data for the webpage. In one embodiment, the contributing individual correction data is associated with the specific website/webpage and recorded and stored in a memory or database.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, the contributing individual correction data for the webpage is then transformed into contributing individual originated parser scripts associated with the webpage.

Parser scripts, and methods, means, mechanisms, processes, and procedures for transforming input data into parser scripts are known in the art. Consequently, a more detailed discussion of specific parser scripts, and methods, means, mechanisms, processes, and procedures for transforming input data into parser scripts are omitted here to avoid detracting from the invention.

In one embodiment, the contributing individual originated parser scripts are then reviewed and/or approved. In one embodiment, the contributing individual originated parser scripts are reviewed and approved by the contributing individual. In one embodiment, the contributing individual originated parser scripts are reviewed and approved by other individuals using the data management system. In one embodiment, the contributing individual originated parser scripts are reviewed and approved by the provider of the data management system.

In one embodiment, the approved contributing individual originated parser scripts are then implemented and/or applied to the webpage for all individuals, including the contributing individual, going forward, e.g., the approved contributing individual originated parser scripts are then used to, along with an individual's login credential data, access the individual's accounts and data on the third party webpage.

Using the system and method for providing a net effect platform for developing and correcting screen scraping scripts discussed herein, individuals using a data management system are provided the capability to elect to become contributing individuals and to create contributing individual originated parser scripts used to access and obtain data from webpages. Consequently, using the system and method for providing a net effect platform for developing and correcting screen scraping scripts discussed herein, parser scripts can be quickly and efficiently corrected, modified, and/or added, without the time delays, inefficiencies, and resources required by current parser script modification correction procedures that are centrally performed by a provider of a data management system.

Hardware System Architecture

FIG. 1 is a block diagram of an exemplary hardware architecture for implementing one embodiment of a process for providing a net effect platform for developing and correcting screen scraping scripts, such as exemplary process 300 (FIG. 3) discussed herein.

FIG. 1 includes contributing individual system 100, e.g., a computing system associated a contributing individual who provides login data 111 and correction data 115; process system 120, e.g., a computing system associated with a provider of a process for providing a net effect platform for developing and correcting screen scraping scripts; third party webpage system 150, e.g., a webserver providing a third party webpage, and communication channels 171 and 173.

As seen in FIG. 1, contributing individual system 100 includes processor/Central Processing Unit (CPU) 101, memory 103, display device 107, and communications interface 109.

In some embodiments, memory 103 includes all or part of data management system 105. In various embodiments, data management system 105 is any data management system as discussed herein, and/or as known/available in the art at the time of filing, and/or as developed/made available after the time of filing. In one embodiment, data management system 105 is a computing system implemented data management system.

In some embodiments, memory 103 includes all or part of login data 111. As discussed below, in one embodiment, login data 111 includes data representing the contributing individual's login credentials for a third party webpage provided by third party webpage system 150.

In one embodiment, once login data 111 is obtained, data management system 105 attempts to access the third party webpage through third party webpage system 150 and/or obtain webpage data 125, and/or various desired data from third party webpage system 150 associated with the individual.

As noted above, data management system 105 typically creates, maintains, and uses "scripts", also referred to herein interchangeably as "parser scripts" and "screen scraping parser scripts", to, along with login data 111, access the individual's accounts and webpage data 125 from third party webpage system 150. As also discussed above, the parser scripts typically are used to indicate where to enter the user's login credentials, and to map/identify the location/placement of data elements and/or data fields within the third party webpage, e.g., data fields containing passwords, user IDs, account numbers, dates, amounts, payees, etc.

As discussed below, webpage simulation 133 is presented to the contributing individual on display device 107.

As discussed below, in one embodiment, webpage simulation 133 is a simulated website/webpage, e.g., a simulation, or mock-up, of at least part of the webpage provided through third party webpage system 150. In one embodiment, the simulated website/webpage of webpage simulation 133 is provided to the contributing individual through contributing individual system 100 and display device 107.

As also discussed below, in one embodiment, the simulated website/webpage of webpage simulation 133 includes data representing at least part of the webpage including default data 130 indicating the layout of the webpage, and/or one or more identified data fields.

In one embodiment, default data 130 is determined based on heuristic analysis and data provided by other users of data management system 105. For instance, as a specific illustrative example, if in a threshold number of instances, data from other users indicates that a nine digit number after the text "account number" is the account number, then default data includes data such that, a nine digit number after the text "account number" is identified in webpage simulation 133 as the account number or account number field.

In one embodiment, the simulated website/webpage of webpage simulation 133 is provided to the contributing individual as an interactive Graphical User Interface (GUI) through which the contributing individual can add, modify, correct, and/or rearrange default data 130 in the simulated website/webpage of webpage simulation 133.

In one embodiment, the contributing individuals associated with contributing individual system 100 utilizing data management system 105 are provided the capability to correct, modify, add data to, delete data from, and/or otherwise edit webpage simulation 133 and/or default data 130. In one embodiment, the contributing individual's additions, modifications, corrections, and/or rearrangements of the default data 130 and/or in the simulated website/webpage of webpage simulation 133 are transformed into correction data 115 representing contributing individual correction data for the webpage simulated. In one embodiment, correction data 115 is associated with the specific website/webpage of webpage simulation 133 and recorded and stored in a memory or database. In some embodiments, memory 103 includes all or part of correction data 115.

In various embodiments, contributing individual system 100 can be any computing system discussed herein, and/or as known in the art at the time of filing, and/or as developed after the time of filing.

In various embodiments, contributing individual system 100 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, contributing individual system 100, whether available or known at the time of filing or as later developed.

Process system 120 can be any computing system as discussed herein, and/or as known in the art at the time of filing, and/or as developed thereafter, that includes components that can execute all, or part, of a process for providing a net effect platform for developing and correcting screen scraping scripts in accordance with at least one of the embodiments as described herein.

In one embodiment, process system 120 includes one or more Central Processing Units (CPUs) 121, memory 122, and communications interface 129.

In one embodiment, memory 122 includes all, or part, of data management system 105. In some embodiments, data management system 105 is any data management system as discussed herein, and/or as known/available in the art at the time of filing, and/or as developed/made available after the time of filing. In one embodiment, data management system 105 is a web-based, or server implemented, data management system.

In one embodiment, memory 122 includes all, or part, of login data 111 as received from contributing individual system 100 via communications interfaces 109 and 129.

In one embodiment, memory 122 includes webpage access module 123 that provides login data 111 to third party webpage system 150 and attempts to access data on the webpage provided by third party webpage system 150, such as webpage data 125, as discussed above.

In one embodiment, memory 122 includes default data generation module 127 that generates default data 130. As discussed above, in one embodiment, default data 130 is determined by default data generation module 127 based on heuristic analysis and data provided by other users of data management system 105.

In one embodiment, memory 122 includes webpage simulation generation module 131 that generates webpage simulation 133. As discussed above, the simulated website/webpage of webpage simulation 133 includes default data 130 indicating the layout of the webpage provided by third party webpage system 150, and/or one or more identified data fields.

In one embodiment, memory 122 includes correction data 115. As discussed above, in one embodiment, the contributing individuals associated with contributing individual system 100 utilizing data management system 105 are provided the capability to correct, modify, add data to, delete data from, and/or otherwise edit webpage simulation 133 and/or default data 130. In one embodiment, the contributing individual's additions, modifications, corrections, and/or rearrangements of the default data 130 and/or in the simulated website/webpage of webpage simulation 133 are transformed into correction data 115 representing contributing individual correction data for the webpage simulated. In one embodiment, correction data 115 is associated with the specific website/webpage of webpage simulation 133 and recorded and stored in a memory or database. In some embodiments, memory 103 includes all or part of correction data 115.

In one embodiment, memory 122 includes parser script generation module 135 which, as discussed below, transforms correction data 115 into parser script data 137.

Process system 120 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

Third party webpage system 150 can be any computing system as discussed herein, and/or as known in the art at the time of filing, and/or as developed thereafter, that includes components that can execute all, or part, of a process for providing a net effect platform for developing and correcting screen scraping scripts in accordance with at least one of the embodiments as described herein.

In one embodiment, third party webpage system 150 includes memory 153, and communications interface 159.

In one embodiment, memory 153 includes login data 111 provided by process system 120 via communications interfaces 129 and 159.

In one embodiment, memory 153 includes webpage data 125 that includes data indicating the layout of the website/webpage provided through third party webpage system 150 and/or data associated with the contributing individual accessed using login data 111, and desired for processing by data management system 105.

Third party webpage system 150 may further include standard interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

In one embodiment, any, or all, of communications channels 171 and 173 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, contributing individual system 100, provider system 120, and/or third party webpage system 150 are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, contributing individual system 100, provider system 120, and/or third party webpage system 150 are not relevant.

In various embodiments, the elements shown in FIG. 1 are grouped into one or more processes, or sub-processes, used to implement all, or part of, a process for providing a net effect platform for developing and correcting screen scraping scripts, such as exemplary process 300 (FIG. 3) discussed herein.

Figure 2A:
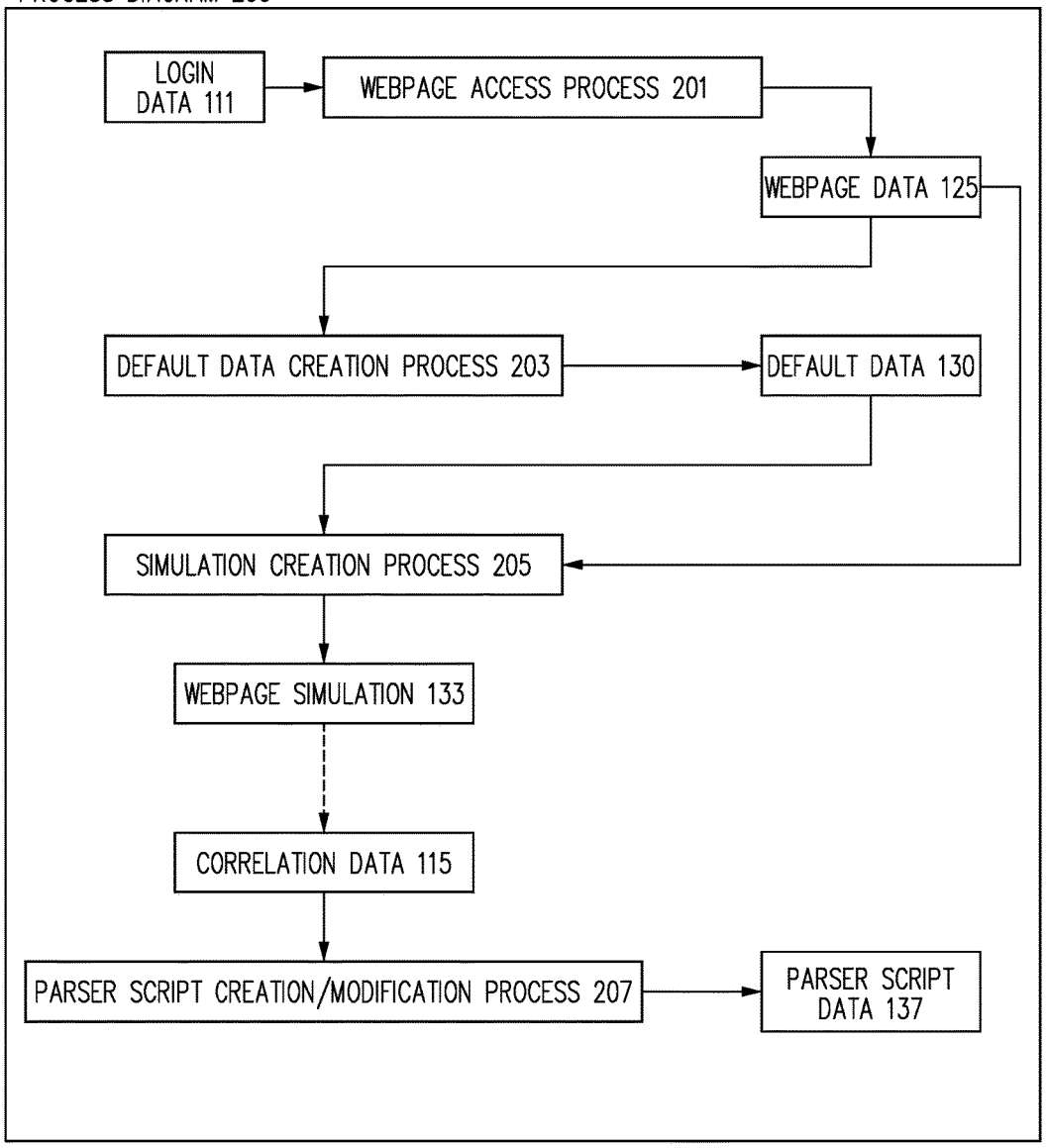
FIG. 2A is a process diagram of part of a process for providing a net effect platform for developing and correcting screen scraping scripts in accordance with one embodiment.

FIG. 2A is a process diagram showing one illustrative example of the interaction of various illustrative processes, or sub-processes, 201, 203, 205, and 207 used to implement part of a process for providing a net effect platform for developing and correcting screen scraping scripts, such as exemplary process 300 (FIG. 3) discussed herein.

FIGS. 2B, 2C, 2D, and 2E show illustrative examples of processes 201, 203, 205, and 207 in accordance with one embodiment.

Referring to FIG. 1, FIG. 2A, FIG. 2B, FIG. 2C, FIG. 2D, and FIG. 2E together, login data 111 is provided to webpage access process 201 which uses login data 111 to access, or attempt to access, the third party webpage provided by third party webpage system 150, and obtain webpage data 125. Webpage access process 201 is shown in more detail in FIG. 2B.

Figure 2B:
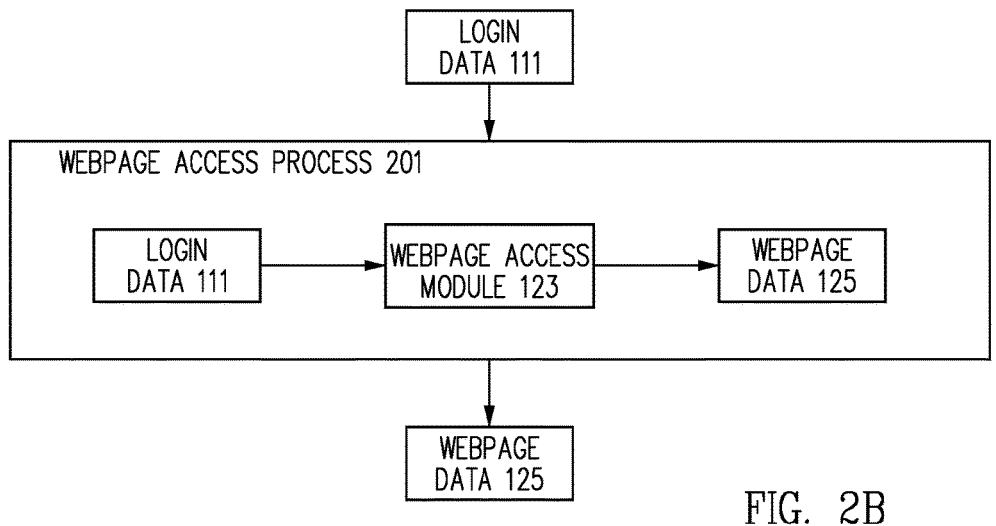
FIG. 2B shows a webpage access process in accordance with one embodiment.

As seen in FIG. 2B, login data 111 is provided as input data to webpage access module 123.

As noted above, many data management systems, such as, but not limited to, financial management systems, obtain data to process, such as but not limited to, financial transaction data, by scraping it off the webpages provided by various third parties, such as, but not limited to, financial institutions associated with a user. To this end, in one embodiment, once login data 111 obtained, webpage access module 123 attempts to access the third party webpage through third party webpage system 150 and/or obtain webpage data 125, and/or various desired data from third party webpage system 150 associated with the individual.

Figure 2C:
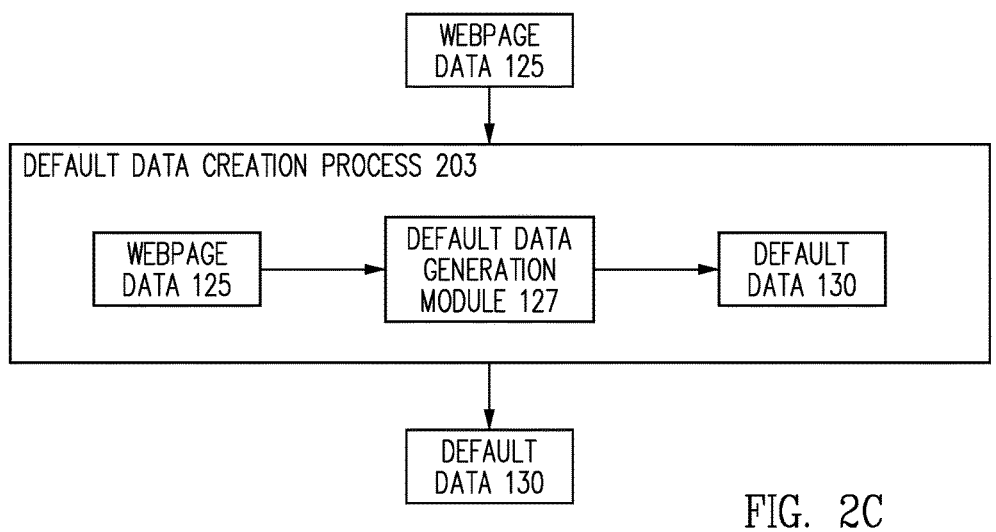
FIG. 2C shows a default data creation process in accordance with one embodiment.

Referring back to FIG. 1, FIG. 2A, FIG. 2B, FIG. 2C, FIG. 2D, and FIG. 2E together, webpage data 125 is provided to default data creation process 203 where at least part of webpage data 125 is used, in part, to determine default data 130. FIG. 2C shows default data creation process 203 in more detail.

As seen in FIG. 2B, webpage data 125 is used as input data to default data generation module 127 which generates default data 130. As discussed above, default data 130 includes data indicating the layout of the webpage provided by third party webpage system 150, and/or one or more identified data fields of the webpage provided by third party webpage system 150.

As also discussed above, in one embodiment, default data 130 is determined based on heuristic analysis and data provided by other users of data management system 105.

Figure 2D:
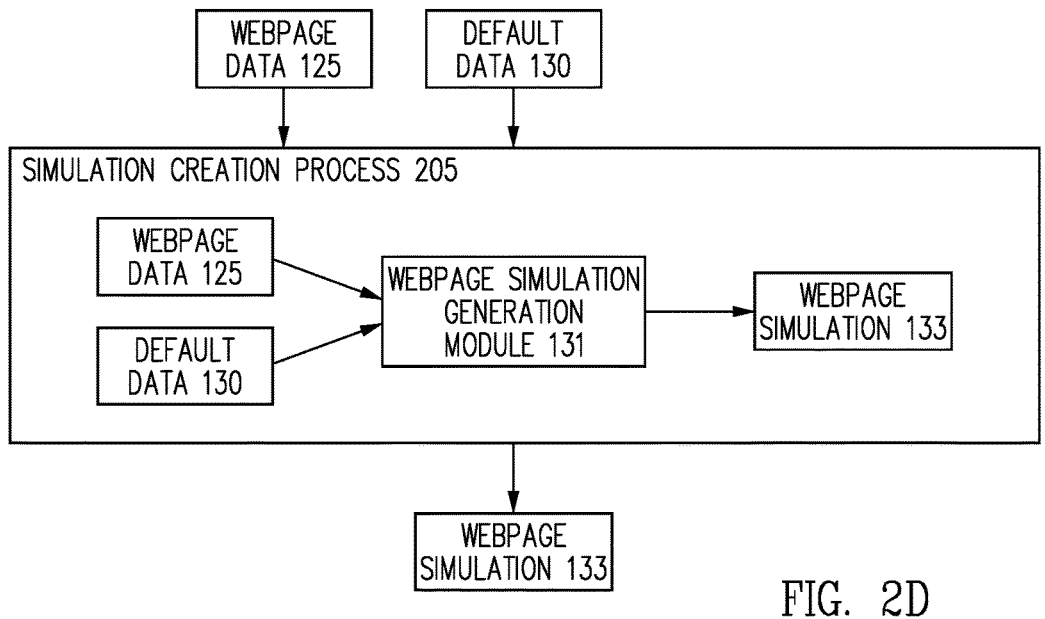
FIG. 2D shows a simulation creation process in accordance with one embodiment.

Referring back to FIG. 1, FIG. 2A, FIG. 2B, FIG. 2C, FIG. 2D, and FIG. 2E together, webpage data 125 and default data 130 are provided to simulation creation process 205 which generates webpage simulation 133. FIG. 2D shows simulation creation process 205.

As seen in FIG. 2D, webpage data 125 and default data 130 are used as input data to webpage simulation generation module 131. As discussed below, in one embodiment, webpage simulation generation module 131 generates webpage simulation 133. As also discussed below, the simulated website/webpage of webpage simulation 133 includes default data 130 indicating the layout of the webpage provided by third party webpage system 150, and/or one or more identified data fields.

As discussed below, in one embodiment, the contributing individuals associated with contributing individual system 100 utilizing data management system 105 are provided the capability to correct, modify, add data to, delete data from, and/or otherwise edit webpage simulation 133 and/or default data 130. In one embodiment, the contributing individual's additions, modifications, corrections, and/or rearrangements of the default data 130 and/or in the simulated website/webpage of webpage simulation 133 are transformed into correction data 115 representing contributing individual correction data for the webpage simulated. In one embodiment, correction data 115 is associated with the specific website/webpage of webpage simulation 133 and recorded and stored in a memory or database.

Figure 2E:
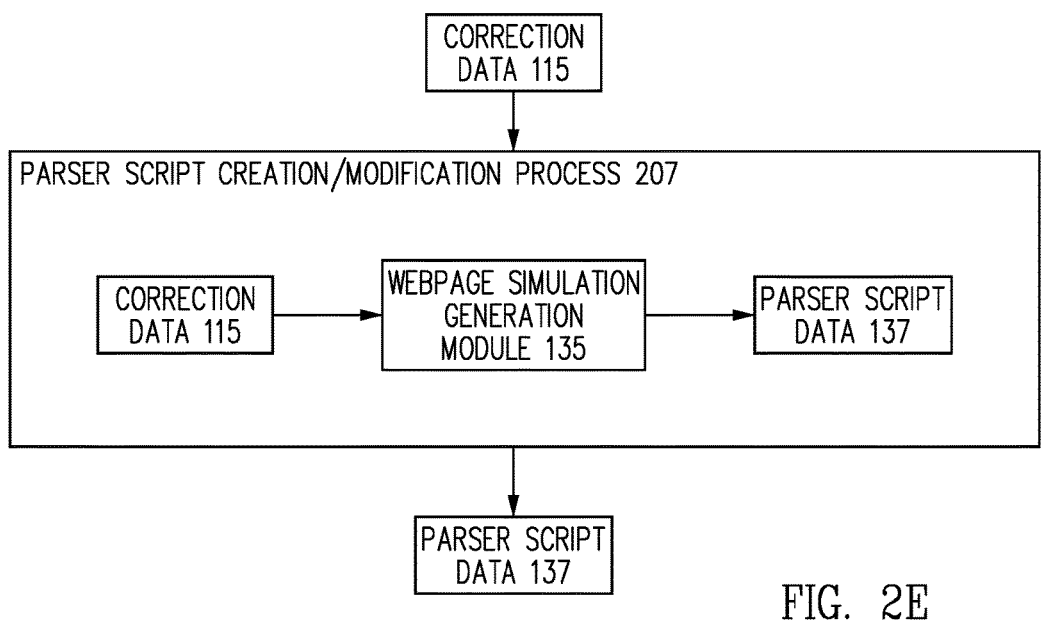
FIG. 2E shows a parser script creation/modification process in accordance with one embodiment.

Referring back to FIG. 1, FIG. 2A, FIG. 2B, FIG. 2C, FIG. 2D, and FIG. 2E together, correction data 115 is provided to parser script creation/modification process 207 which transforms correction data 115 into parser script data 137. FIG. 2E shows parser script creation/modification process 207 in more detail.

As seen in FIG. 2E, correction data 115 is used as input data to parser script generation module 135. Parser script generation module 135 then transforms correction data 115 into contributing individual originated parser scripts, included in parser script data 137, associated with the webpage provided by third party webpage system 150.

Parser scripts, and methods, means, mechanisms, processes, and procedures for transforming input data into parser scripts are known in the art. Consequently, a more detailed discussion of specific parser scripts, and methods, means, mechanisms, processes, and procedures for transforming input data into parser scripts are omitted here to avoid detracting from the invention.

In one embodiment, the contributing individual originated parser scripts of parser script data 137 are then reviewed and/or approved. In one embodiment, the contributing individual originated parser scripts of parser script data 137 are reviewed and approved by the contributing individual. In one embodiment, the contributing individual originated parser scripts of parser script data 137 are reviewed and approved by other individuals using data management system 105. In one embodiment, the contributing individual originated parser scripts of parser script data 137 are reviewed and approved by the provider of data management system 105.

In one embodiment, the approved contributing individual originated parser scripts of parser script data 137 are then implemented and/or applied to the webpage provided by third party webpage system 150 for all individuals, including the contributing individual, going forward, e.g., the approved contributing individual originated parser scripts of parser script data 137 are then used to, along with login data 111, access the individual's accounts and webpage data 125 on the third party webpage provided by third party webpage system 150.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a method and system for providing a net effect platform for developing and correcting screen scraping parser scripts provides for screen scraping parser script development and correction/modification by the individuals using a data management system rather than the provider of the data management system.

In one embodiment, individuals using a data management system enter their login credentials associated with a given webpage. In one embodiment, an attempt is then made to access the webpage and/or obtain the data contained on the webpage. In one embodiment, if an error is encountered during the attempt to access the webpage and/or obtain the data contained on the webpage, the individual user is asked if they would like to help correct the issue. If the individual indicates they would like to help, the individual is designated a contributing individual and is provided a simulation of at least part of the webpage including default data indicating the layout of the webpage, and/or one or more identified data fields, derived by heuristic analysis and/or from data collected from other individuals/users.

In one embodiment, when the individual makes corrections to the default values presented in the simulation of the webpage, these corrections are obtained as contributing individual correction data for the webpage. In one embodiment, the contributing individual correction data for the webpage is then transformed into contributing individual originated parser scripts associated with the webpage. In one embodiment, the contributing individual originated parser scripts are then reviewed and/or approved. In one embodiment, the approved contributing individual originated parser scripts are then implemented and/or applied to the webpage for all individuals.

Figure 3:
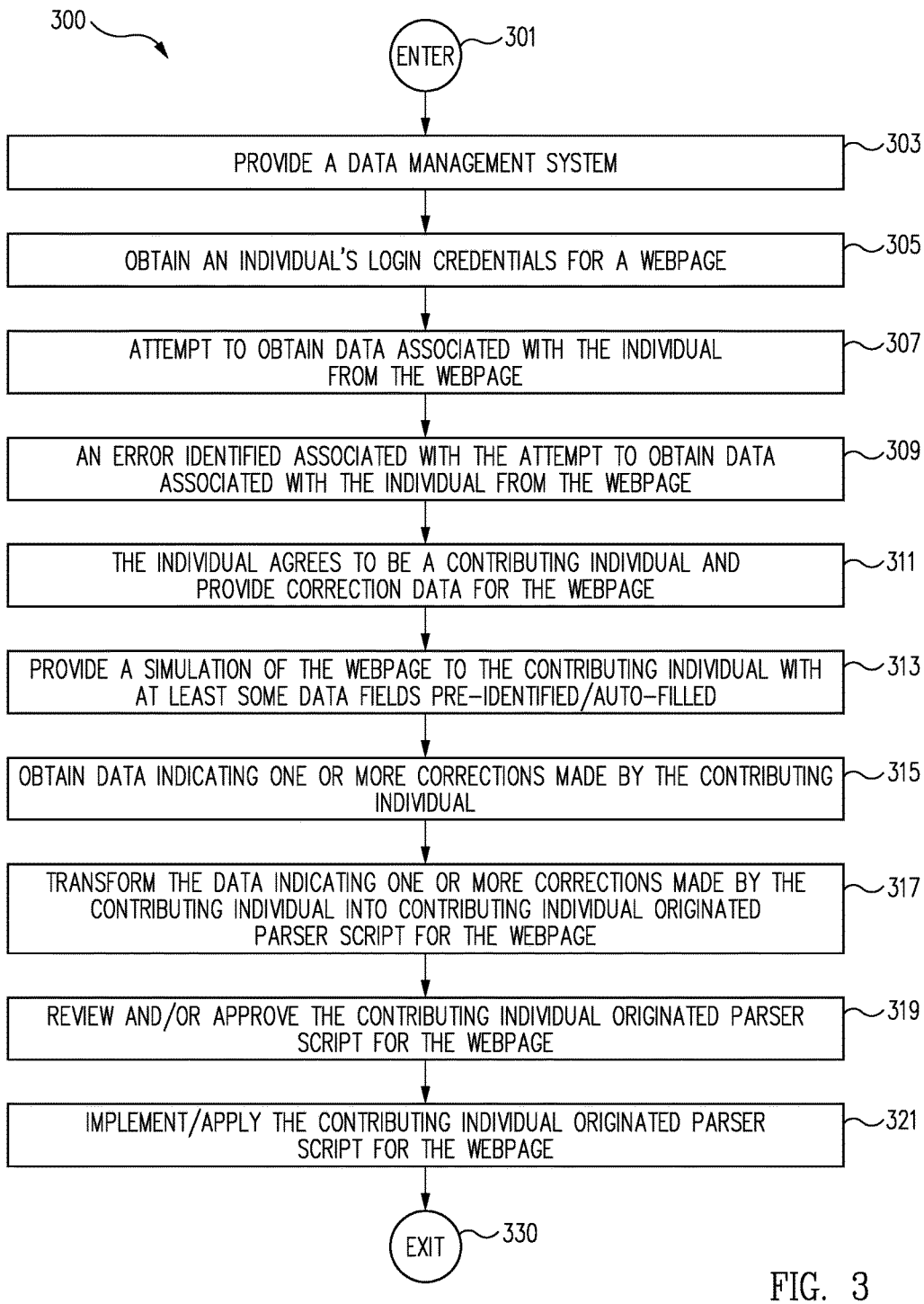
FIG. 3 is a flow chart depicting a process for providing a net effect platform for developing and correcting screen scraping scripts in accordance with one embodiment.

FIG. 3 is a flow chart depicting a process 300 for providing a net effect platform for developing and correcting screen scraping scripts in accordance with one embodiment. Process 300 for providing a net effect platform for developing and correcting screen scraping scripts begins at ENTER OPERATION 301 of FIG. 3 and process flow proceeds to PROVIDE A DATA MANAGEMENT SYSTEM OPERATION 303.

In accordance with one embodiment, process 300 for providing a net effect platform for developing and correcting screen scraping scripts is part of, linked to, or otherwise associated with, one or more data management systems used by one or more individuals. Consequently, in one embodiment, at PROVIDE A DATA MANAGEMENT SYSTEM OPERATION 303, a data management system is provided to one or more individuals.

In one embodiment, the data management system provided at PROVIDE A DATA MANAGEMENT SYSTEM OPERATION 303 is any data management system as discussed herein, and/or as known in the art at the time of filing, and/or as developed after the time of filing.

In one embodiment, each of the one or more individuals provided the data management system at PROVIDE A DATA MANAGEMENT SYSTEM OPERATION 303 creates and utilizes their own implementation of the data management system provided at PROVIDE A DATA MANAGEMENT SYSTEM OPERATION 303.

In some embodiments, each of the one or more individuals provided the data management system at PROVIDE A DATA MANAGEMENT SYSTEM OPERATION 303 access their implementation of the data management system from a server computing system and/or a network or cloud.

In some embodiments, each of the one or more individuals provided the data management system at PROVIDE A DATA MANAGEMENT SYSTEM OPERATION 303 run, and access, their implementation of the data management system on their own local computing system.

In some embodiments, each of the one or more individuals provided the data management system at PROVIDE A DATA MANAGEMENT SYSTEM OPERATION 303 access their implementation of the data management system from a webpage or any other network discussed herein, and/or as known in the art at the time of filing, and/or as developed after the time of filing.

As noted, in one embodiment, the data management system provided at PROVIDE A DATA MANAGEMENT SYSTEM OPERATION 303 includes, is a parent system for, or is otherwise associated with, process 300 for providing a net effect platform for developing and correcting screen scraping scripts.

In one embodiment, once a data management system is provided to one or more individuals at PROVIDE A DATA MANAGEMENT SYSTEM OPERATION 303, process flow proceeds to OBTAIN AN INDIVIDUAL'S LOGIN CREDENTIALS FOR A WEBPAGE OPERATION 305.

In one embodiment, at OBTAIN AN INDIVIDUAL'S LOGIN CREDENTIALS FOR A WEBPAGE OPERATION 305 an individual, i.e., a user of the data management system of PROVIDE A DATA MANAGEMENT SYSTEM OPERATION 303, provides data representing their login credentials for a third party webpage to the provider of the data management system.

As noted above, data management systems, such as, but not limited to, financial management systems, obtain data to process, such as but not limited to, financial transaction data, by scraping it off the webpages provided by various third parties, such as, but not limited to, financial institutions.

To perform this screen scraping task, at OBTAIN AN INDIVIDUAL'S LOGIN CREDENTIALS FOR A WEBPAGE OPERATION 305 the user provides his or her login credentials, such as but not limited to, the individual's user name, password, account number, etc. for the webpage.

In one embodiment, at OBTAIN AN INDIVIDUAL'S LOGIN CREDENTIALS FOR A WEBPAGE OPERATION 305 the individual provides the data representing their login credentials for the third party webpage to the provider of the data management system through a user interface screen provided through the data management system using any user interface device, as discussed herein, and/or as known in the art at the time of filing, and/or as developed after the time of filing.

In one embodiment, at OBTAIN AN INDIVIDUAL'S LOGIN CREDENTIALS FOR A WEBPAGE OPERATION 305 the individual provides the data representing their login credentials for a third party webpage through one or more computing systems and/or network locations; e-mail; text message; POTS; or any other method, means, mechanism, process or procedure for transferring data discussed herein, and/or as known/available in the art at the time of filing, and/or as developed/made available after the time of filing.

In one embodiment, once an individual, i.e., a user of the data management system of PROVIDE A DATA MANAGEMENT SYSTEM OPERATION 303, provides data representing their login credentials for a third party webpage to the provider of the data management system at OBTAIN AN INDIVIDUAL'S LOGIN CREDENTIALS FOR A WEBPAGE OPERATION 305, process flow proceeds to ATTEMPT TO OBTAIN DATA ASSOCIATED WITH THE INDIVIDUAL FROM THE WEBPAGE OPERATION 307.

In one embodiment, at ATTEMPT TO OBTAIN DATA ASSOCIATED WITH THE INDIVIDUAL FROM THE WEBPAGE OPERATION 307 the data management system attempts to access the third party webpage of OBTAIN AN INDIVIDUAL'S LOGIN CREDENTIALS FOR A WEBPAGE OPERATION 305, and/or obtain various desired data from the third party webpage of OBTAIN AN INDIVIDUAL'S LOGIN CREDENTIALS FOR A WEBPAGE OPERATION 305 associated with the individual.

As noted above, data management systems typically create, maintain, and use "scripts", also referred to herein interchangeably as "parser scripts" and "screen scraping parser scripts", to, along with the individual's login credential data of OBTAIN AN INDIVIDUAL'S LOGIN CREDENTIALS FOR A WEBPAGE OPERATION 305, access the individual's accounts and data on the third party webpage.

As also discussed above, the parser scripts typically are used to indicate where to enter the user's login credentials of OBTAIN AN INDIVIDUAL'S LOGIN CREDENTIALS FOR A WEBPAGE OPERATION 305, and to map/identify the location/placement of data elements and/or data fields within the third party webpage, e.g., data fields containing passwords, user IDs, account numbers, dates, amounts, payees, etc.

As also noted above, screen scraping parser scripts are prone to error because the third parties often change the look, feel, layout, and other aspects of the webpages they provide.

In one embodiment, once the data management system attempts to access the third party webpage of OBTAIN AN INDIVIDUAL'S LOGIN CREDENTIALS FOR A WEB- PAGE OPERATION 305, and/or obtain various desired data from the third party webpage of OBTAIN AN INDIVIDUAL'S LOGIN CREDENTIALS FOR A WEBPAGE OPERATION 305 associated with the individual at ATTEMPT TO OBTAIN DATA ASSOCIATED WITH THE INDIVIDUAL FROM THE WEBPAGE OPERATION 307, process flow proceeds to AN ERROR IS IDENTIFIED ASSOCIATED WITH THE ATTEMPT TO OBTAIN DATA ASSOCIATED WITH THE INDIVIDUAL FROM THE WEBPAGE OPERATION 309.

In one embodiment, at AN ERROR IS IDENTIFIED ASSOCIATED WITH THE ATTEMPT TO OBTAIN DATA ASSOCIATED WITH THE INDIVIDUAL FROM THE WEBPAGE OPERATION 309, when the data management system attempts to access the third party webpage and/or obtain various desired data from the third party webpage associated with the individual for processing by the data management system at ATTEMPT TO OBTAIN DATA ASSOCIATED WITH THE INDIVIDUAL FROM THE WEBPAGE OPERATION 307, an error occurs and all, or part of the desired access and data either fails or is not obtained.

In one embodiment, once the error is identified, e.g., access is not obtained, or the desired data is not obtained, or made available for processing, the individual is contacted at AN ERROR IS IDENTIFIED ASSOCIATED WITH THE ATTEMPT TO OBTAIN DATA ASSOCIATED WITH THE INDIVIDUAL FROM THE WEBPAGE OPERATION 309 and asked if they would like to participate in identifying and correcting the issue that caused the error.

In one embodiment, the individual is contacted at AN ERROR IS IDENTIFIED ASSOCIATED WITH THE ATTEMPT TO OBTAIN DATA ASSOCIATED WITH THE INDIVIDUAL FROM THE WEBPAGE OPERATION 309 and asked if they would like to participate in identifying and correcting the issue that caused the error via a user interface screen provided by the data management system on a display device of a contributor computing system implementing, or accessing, at least part of the data management system.

In one embodiment, the individual is contacted at AN ERROR IS IDENTIFIED ASSOCIATED WITH THE ATTEMPT TO OBTAIN DATA ASSOCIATED WITH THE INDIVIDUAL FROM THE WEBPAGE OPERATION 309 and asked if they would like to participate in identifying and correcting the issue that caused the error via one or more computing systems and/or network locations; e-mail; text message; POTS; or any other method, means, mechanism, process or procedure for transferring data discussed herein, and/or as known/available in the art at the time of filing, and/or as developed/made available after the time of filing.

In one embodiment, once an error occurs and all, or part of the desired access and data either fails or is not obtained and the individual is contacted and asked if they would like to participate in identifying and correcting the issue that caused the error at AN ERROR IS IDENTIFIED ASSOCIATED WITH THE ATTEMPT TO OBTAIN DATA ASSOCIATED WITH THE INDIVIDUAL FROM THE WEBPAGE OPERATION 309, process flow proceeds to THE INDIVIDUAL AGREES TO BE A CONTRIBUTING INDIVIDUAL AND PROVIDE CORRECTION DATA FOR THE WEBPAGE OPERATION 311.

In one embodiment, at THE INDIVIDUAL AGREES TO BE A CONTRIBUTING INDIVIDUAL AND PROVIDE CORRECTION DATA FOR THE WEBPAGE OPERATION 311, the individual indicates they would like to help and the individual is designated a contributing individual.

In one embodiment, at THE INDIVIDUAL AGREES TO BE A CONTRIBUTING INDIVIDUAL AND PROVIDE CORRECTION DATA FOR THE WEBPAGE OPERATION 311, the individual indicates they would like to help via a user interface screen provided by the data management system on a display device of a contributor computing system implementing, or accessing, at least part of the data management system.

In one embodiment, at THE INDIVIDUAL AGREES TO BE A CONTRIBUTING INDIVIDUAL AND PROVIDE CORRECTION DATA FOR THE WEBPAGE OPERATION 311, the individual indicates they would like to help via one or more computing systems and/or network locations; e-mail; text message; POTS; or any other method, means, mechanism, process or procedure for transferring data discussed herein, and/or as known/available in the art at the time of filing, and/or as developed/made available after the time of filing.

In one embodiment, once the individual indicates they would like to help and the individual is designated a contributing individual at THE INDIVIDUAL AGREES TO BE A CONTRIBUTING INDIVIDUAL AND PROVIDE CORRECTION DATA FOR THE WEBPAGE OPERATION 311, process flow proceeds to PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313.

In one embodiment, at PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313, a simulated website/webpage, e.g., a simulation, or mock-up, of at least part of the webpage associated with the attempted access and error of AN ERROR IS IDENTIFIED ASSOCIATED WITH THE ATTEMPT TO OBTAIN DATA ASSOCIATED WITH THE INDIVIDUAL FROM THE WEBPAGE OPERATION 309, is generated and provided to the contributing individual.

In one embodiment, the simulated website/webpage is provided to the contributing individual at PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 through a user interface screen provided by the data management system on a display device of a contributor computing system implementing, or accessing, at least part of the data management system.

In one embodiment, the simulated website/webpage of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 includes data representing at least part of the webpage including default data indicating the layout of the webpage, and/or one or more identified data fields, provided as defaults.

In one embodiment, the default data of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 is determined based on heuristic analysis and data provided by other users of the data management system.

For instance, as a specific illustrative example, if in a threshold number of instances, data indicates that a nine digit number after the text "account number" is the account number, then as a default, a nine digit number after the text "account number" is identified in the simulated website/webpage of PROVIDE A SIMULATION OF THE WEB- PAGE TO THE CONTRIBUTING INDIVIDUAL WITH AT LEAST SOME DATA FIELDS PRE-IDENTIFIED/AUTO-FILLED OPERATION 313 as the account number or account number field.

As another specific illustrative example, if in a threshold number of instances, data indicates data in tables with double borders contain financial transaction amounts, then as a default, data in tables with double borders is identified in the simulated website/webpage of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 as the transaction amount, or transaction amount field.

In one embodiment, the simulated website/webpage is provided to the contributing individual at PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 as an interactive Graphical User Interface (GUI) through which the contributing individual can add, modify, correct, and/or rearrange the default data in the simulated website/webpage.

In one embodiment, once a simulated website/webpage, e.g., a simulation, or mock-up, of at least part of the webpage associated with the attempted access and error of AN ERROR IS IDENTIFIED ASSOCIATED WITH THE ATTEMPT TO OBTAIN DATA ASSOCIATED WITH THE INDIVIDUAL FROM THE WEBPAGE OPERATION 309, is generated and provided to the contributing individual at PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313, process flow proceeds to OBTAIN DATA INDICATING ONE OR MORE CORRECTIONS MADE BY THE CONTRIBUTING INDIVIDUAL OPERATION 315.

In one embodiment, at OBTAIN DATA INDICATING ONE OR MORE CORRECTIONS MADE BY THE CONTRIBUTING INDIVIDUAL OPERATION 315 the contributing individual identifies the source of the one or more errors of AN ERROR IS IDENTIFIED ASSOCIATED WITH THE ATTEMPT TO OBTAIN DATA ASSOCIATED WITH THE INDIVIDUAL FROM THE WEBPAGE OPERATION 309 and/or adds, modifies, corrects, and/or rearranges the default data in the simulated website/webpage of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313.

In one embodiment, at OBTAIN DATA INDICATING ONE OR MORE CORRECTIONS MADE BY THE CONTRIBUTING INDIVIDUAL OPERATION 315 the contributing individual's additions, modifications, corrections, and/or rearrangements of the default data in the simulated website/webpage are transformed into contributing individual correction data for the webpage.

In one embodiment, at OBTAIN DATA INDICATING ONE OR MORE CORRECTIONS MADE BY THE CONTRIBUTING INDIVIDUAL OPERATION 315 the contributing individual correction data is associated with the specific website/webpage and recorded and stored in a memory or database.

In one embodiment, at OBTAIN DATA INDICATING ONE OR MORE CORRECTIONS MADE BY THE CONTRIBUTING INDIVIDUAL OPERATION 315 the contributing individual adds, modifies, corrects, and/or rearranges the default data in the simulated website/webpage through a user interface screen provided by the data management system on a display device of a contributor computing system implementing, or accessing, at least part of the data management system.

In one embodiment, once the contributing individual identifies the source of the one or more errors of AN ERROR IS IDENTIFIED ASSOCIATED WITH THE ATTEMPT TO OBTAIN DATA ASSOCIATED WITH THE INDIVIDUAL FROM THE WEBPAGE OPERATION 309 and/or adds, modifies, corrects, and/or rearranges the default data in the simulated website/webpage of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313, process flow proceeds to TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317.

In one embodiment, at TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 the contributing individual correction data for the webpage of OBTAIN DATA INDICATING ONE OR MORE CORRECTIONS MADE BY THE CONTRIBUTING INDIVIDUAL OPERATION 315 is transformed into contributing individual originated parser scripts associated with the webpage.

In one embodiment, at TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 the contributing individual correction data for the webpage of OBTAIN DATA INDICATING ONE OR MORE CORRECTIONS MADE BY THE CONTRIBUTING INDIVIDUAL OPERATION 315 is transformed into contributing individual originated parser scripts associated with the webpage under the direction of one or more processors, such as CPU 121 of FIG. 1, associated with one or more computing systems, such as process system 120 of FIG. 1.

Parser scripts, and methods, means, mechanisms, processes, and procedures for transforming input data into parser scripts are known in the art. Consequently, a more detailed discussion of specific parser scripts, and methods, means, mechanisms, processes, and procedures for transforming input data into parser scripts are omitted here to avoid detracting from the invention.

Returning to FIG. 3, once the contributing individual correction data for the webpage of OBTAIN DATA INDICATING ONE OR MORE CORRECTIONS MADE BY THE CONTRIBUTING INDIVIDUAL OPERATION 315 is transformed into contributing individual originated parser scripts associated with the webpage at TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317, process flow proceeds to REVIEW AND/OR APPROVE THE CONTRIBUTING INDIVIDUAL ORIGINATED PARSER SCRIPT FOR THE WEBPAGE OPERATION 319.

In one embodiment, at REVIEW AND/OR APPROVE THE CONTRIBUTING INDIVIDUAL ORIGINATED PARSER SCRIPT FOR THE WEBPAGE OPERATION 319 the contributing individual originated parser scripts of TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 are reviewed and/or approved.

In one embodiment, at REVIEW AND/OR APPROVE THE CONTRIBUTING INDIVIDUAL ORIGINATED PARSER SCRIPT FOR THE WEBPAGE OPERATION 319 the contributing individual originated parser scripts of TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 are reviewed and/or approved by the contributing individual.

In one embodiment, at REVIEW AND/OR APPROVE THE CONTRIBUTING INDIVIDUAL ORIGINATED PARSER SCRIPT FOR THE WEBPAGE OPERATION 319 the contributing individual originated parser scripts of TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 are reviewed and/or approved by other individuals using the data management system.

In one embodiment, at REVIEW AND/OR APPROVE THE CONTRIBUTING INDIVIDUAL ORIGINATED PARSER SCRIPT FOR THE WEBPAGE OPERATION 319 the contributing individual originated parser scripts of TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 are reviewed and/or approved by the provider of the data management system of PROVIDE A DATA MANAGEMENT SYSTEM OPERATION 303.

In one embodiment, once the contributing individual originated parser scripts of TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 are reviewed and/or approved at REVIEW AND/OR APPROVE THE CONTRIBUTING INDIVIDUAL ORIGINATED PARSER SCRIPT FOR THE WEBPAGE OPERATION 319, process flow proceeds to IMPLEMENT/APPLY THE CONTRIBUTING INDIVIDUAL ORIGINATED PARSER SCRIPT FOR THE WEBPAGE OPERATION 321.

In one embodiment, at IMPLEMENT/APPLY THE CONTRIBUTING INDIVIDUAL ORIGINATED PARSER SCRIPT FOR THE WEBPAGE OPERATION 321 the approved contributing individual originated parser scripts of REVIEW AND/OR APPROVE THE CONTRIBUTING INDIVIDUAL ORIGINATED PARSER SCRIPT FOR THE WEBPAGE OPERATION 319 are implemented and/or applied to the webpage of ATTEMPT TO OBTAIN DATA ASSOCIATED WITH THE INDIVIDUAL FROM THE WEBPAGE OPERATION 307 for all individuals, including the contributing individual, going forward, e.g., the approved contributing individual originated parser scripts are then used to, along with an individual's login credential data, to access the individual's accounts and data on the third party webpage.

As a specific illustrative example of one embodiment, assume a financial management system is provided at PROVIDE A DATA MANAGEMENT SYSTEM OPERATION 303.

In this specific illustrative example, assume an individual adds the individual's credentials for a new financial institution at OBTAIN AN INDIVIDUAL'S LOGIN CREDENTIALS FOR A WEBPAGE OPERATION 305.

In one embodiment, a simulator of PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 determines if the connection is going through and at AN ERROR IS IDENTIFIED ASSOCIATED WITH THE ATTEMPT TO OBTAIN DATA ASSOCIATED WITH THE INDIVIDUAL FROM THE WEBPAGE OPERATION 309 an error is detected.

In one embodiment, at PROVIDE A SIMULATION OF THE WEBPAGE TO THE CONTRIBUTING INDIVIDUAL WITH AT LEAST SOME DATA FIELDS PRE-IDENTIFIED/AUTO-FILLED OPERATION 313 a simulation is provided and heuristics and data entered by other users is used to arrive at a set of default values for the simulation.

For instance, in this specific illustrative example it is determined that a nine digit number after the text "account number" is the account number, and that tables with double borders contain transaction amount data.

In one embodiment, at OBTAIN DATA INDICATING ONE OR MORE CORRECTIONS MADE BY THE CONTRIBUTING INDIVIDUAL OPERATION 315 if the default data is correct, the individual verifies the data, or, if the default data is incorrect, the individual edits incorrect data, and submits the correct data.

In one embodiment, at TRANSFORM THE DATA INDICATING ONE OR MORE CORRECTIONS MADE BY THE CONTRIBUTING INDIVIDUAL INTO CONTRIBUTING INDIVIDUAL ORIGINATED PARSER SCRIPT FOR THE WEBPAGE OPERATION 317 the contributing individual provided approval or correction data is used to create/modify a script that collects the data for other users associated with the financial institution.

In one embodiment, at REVIEW AND/OR APPROVE THE CONTRIBUTING INDIVIDUAL ORIGINATED PARSER SCRIPT FOR THE WEBPAGE OPERATION 319 the other users can choose to use the data/script and not verify the script elements, i.e., the other users can decide to rely on the verification done by others such as the contributing individual.

Returning to FIG. 3, in one embodiment, once the approved contributing individual originated parser scripts of REVIEW AND/OR APPROVE THE CONTRIBUTING INDIVIDUAL ORIGINATED PARSER SCRIPT FOR THE WEBPAGE OPERATION 319 are implemented and/or applied to the webpage of ATTEMPT TO OBTAIN DATA ASSOCIATED WITH THE INDIVIDUAL FROM THE WEBPAGE OPERATION 307 for all individuals, including the contributing individual, going forward at IMPLEMENT/APPLY THE CONTRIBUTING INDIVIDUAL ORIGINATED PARSER SCRIPT FOR THE WEBPAGE OPERATION 321, process flow proceeds to EXIT OPERATION 330.

In one embodiment, at EXIT OPERATION 330, process 300 for providing a net effect platform for developing and correcting screen scraping scripts is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for providing a net effect platform for developing and correcting screen scraping scripts discussed above, individuals using a data management system are provided the capability to elect to become contributing individuals and to create contributing individual originated parser scripts used to access and obtain data from webpages. Consequently, using process 300 for providing a net effect platform for developing and correcting screen scraping scripts, parser scripts can be quickly and efficiently corrected, modified, and/or added, without the time delays, inefficiencies, and resources required by current parser script modification correction procedures that centrally performed by a provider of a data management system.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a net effect platform for developing and correcting screen scraping scripts comprising the following, which when executed individually or collectively by any set of one or more processors perform a process including:
    obtaining, by a process computing system from a user computing system under the control of an individual, login data used to obtain data associated with the individual from a third party webpage provided by a webpage computing system, the obtained login data including at least an account number associated with the user;
    accessing, using some or all of the login data by the process computing system, the third party webpage;
    determining, by the process computing system following an attempt to access the third party webpage, that an error has occurred in retrieving data from the third party webpage;
    requesting, of the user through communication by the process computing system with the first computing system, that the individual help identify and correct the cause of the error;
    receiving acknowledgement from the individual that the individual will help identify and correct the cause of the error;
    generating, by the process computing system, default data associated with a third party webpage, the default data at least indicating the layout of the webpage;
    generating, by the process computing system using the default data, a mock-up of the third party webpage, the mock-up of the third party webpage including a reproduction of at least part of the third party webpage;
    providing, to the user computer system by the process computing system communicating with the user computer system, the mock-up of the third party webpage as an interactive interface, wherein the interactive interface configured to allows the individual to add, modify, correct, and rearrange the default data;
    obtaining, from the interactive interface, additions, modifications, corrections, and/or rearrangements of the default data associated with the third party webpage from the interactive interface, the additions, modifications, corrections, and/or rearrangements of the default data associated with the third party webpage at least including an additions, modifications, corrections, and/or rearrangements of the layout of the webpage;
    transforming the additions, modifications, corrections, and/or rearrangements of the default data associated with the third party webpage into correction data;
    transforming the correction data into parser scripts associated with the third party webpage; and
    using the login data and parser scripts associated with the third party webpage to obtain data associated with the individual from the third party webpage.

2. The computing system implemented method for providing a net effect platform for developing and correcting screen scraping scripts of claim 1 wherein the default data associated with the third party webpage includes data indicating the layout of the third party webpage and/or data identifying data fields within the third party webpage.

3. The computing system implemented method for providing a net effect platform for developing and correcting screen scraping scripts of claim 1 wherein the mock-up of the third party webpage is provided to the individual through a data management system.

4. The computing system implemented method for providing a net effect platform for developing and correcting screen scraping scripts of claim 3 wherein the default data associated with the third party webpage is generated using heuristic analysis and data from other individuals using the data management system.

5. The computing system implemented method for providing a net effect platform for developing and correcting screen scraping scripts of claim 1 wherein the mock-up of the third party webpage is provided to the individual through a financial management system.

6. The computing system implemented method for providing a net effect platform for developing and correcting screen scraping scripts of claim 5 wherein the third party webpage is provided by a third party that is a financial institution.

7. The computing system implemented method for providing a net effect platform for developing and correcting screen scraping scripts of claim 1 wherein the mock-up of the third party webpage is a Graphical User Interface (GUI).

8. The computing system implemented method for providing a net effect platform for developing and correcting screen scraping scripts of claim 1 wherein the parser scripts associated with the third party webpage are reviewed or approved before using the login data and parser scripts associated with the third party webpage to obtain data associated with the individual from the third party webpage.

9. The computing system implemented method for providing a net effect platform for developing and correcting screen scraping scripts of claim 1 wherein the parser scripts associated with the third party webpage are reviewed or approved by the individual.

10. The computing system implemented method for providing a net effect platform for developing and correcting screen scraping scripts of claim 1 wherein the parser scripts associated with the third party webpage are reviewed or approved by the provider of the computing system implemented method for providing a net effect platform for developing and correcting screen scraping scripts.

11. A computer program product for providing a net effect platform for developing and correcting screen scraping scripts comprising:
    a nontransitory computer readable medium;
    and computer program code, encoded on the computer readable medium, comprising computer readable instructions which, when executed via any set of one or more processors, perform the following:
    obtaining, by a process computing system from a user computing system under the control of a user, login data used to obtain data associated with an individual from a third party webpage provided by a webpage computing system, the obtained login data including at least an account number associated with the user;
    accessing, using some or all of the login data by the process computing system, the third party webpage;
    determining, by the process computing system following an attempt to access the third party webpage, that an error has occurred in retrieving data from the third party webpage;
    requesting, of the user through communication by the process computing system with the first computing system, that the user help identify and correct the cause of the error;
    generating, by the process computing system, default data associated with a third party webpage, the default data at least indicating the layout of the webpage;

generating, by the process computing system using the default data, a mock-up of the third party webpage, the mock-up of the third party webpage including a reproduction of at least part of the third party webpage;

providing, to the user computer system by the process computing system communicating with the user computer system, the mock-up of the third party webpage as an interactive interface, wherein the interactive interface configured to allows the individual to add, modify, correct, and/or rearrange the default data;

obtaining, from the interactive interface, additions, modifications, corrections, and/or rearrangements of the default data associated with the third party webpage from the interactive interface, the additions, modifications, corrections, and/or rearrangements of the default data associated with the third party webpage at least including an additions, modifications, corrections, and/or rearrangements of the layout of the webpage;

transforming the additions, modifications, corrections, and/or rearrangements of the default data associated with the third party webpage into correction data;

transforming the correction data into parser scripts associated with the third party webpage; and using the login data and parser scripts associated with the third party webpage to obtain data associated with the individual from the third party webpage.

12. The computer program product for providing a net effect platform for developing and correcting screen scraping scripts of claim 11 wherein the default data associated with the third party webpage includes data indicating the layout of the third party webpage and/or data identifying data fields within the third party webpage.

13. The computer program product for providing a net effect platform for developing and correcting screen scraping scripts of claim 11 wherein the mock-up of the third party webpage is provided to the individual through a data management system.

14. The computer program product for providing a net effect platform for developing and correcting screen scraping scripts of claim 13 wherein the default data associated with the third party webpage is generated using heuristic analysis and data from other individuals using the data management system.

15. The computer program product for providing a net effect platform for developing and correcting screen scraping scripts of claim 11 wherein the mock-up of the third party webpage is provided to the individual through a financial management system.

16. The computer program product for providing a net effect platform for developing and correcting screen scraping scripts of claim 15 wherein the third party webpage is provided by a third party that is a financial institution.

17. The computer program product for providing a net effect platform for developing and correcting screen scraping scripts of claim 11 wherein the mock-up of the third party webpage is a Graphical User Interface (GUI).

18. The computer program product for providing a net effect platform for developing and correcting screen scraping scripts of claim 11 wherein the parser scripts associated with the third party webpage are reviewed or approved before using the login data and parser scripts associated with the third party webpage to obtain data associated with the individual from the third party webpage.

19. The computer program product for providing a net effect platform for developing and correcting screen scraping scripts of claim 11 wherein the parser scripts associated with the third party webpage are reviewed or approved by the individual.

20. The computer program product for providing a net effect platform for developing and correcting screen scraping scripts of claim 11 wherein the parser scripts associated with the third party webpage are reviewed or approved by the provider of the computing system implemented method for providing a net effect platform for developing and correcting screen scraping scripts.

21. A system for providing a net effect platform for developing and correcting screen scraping scripts comprising:

at least one processor; and at least one memory coupled to the at least one processor, the at least one memory having stored therein instructions which when executed by any set of the one or more processors, perform a process for providing a net effect platform for developing and correcting screen scraping scripts, the process for providing a net effect platform for developing and correcting screen scraping scripts including:

obtaining, by a process computing system from a user computing system under the control of a user, login data used to obtain data associated with an individual from a third party webpage provided by a webpage computing system, the obtained login data including at least an account number associated with the user;

accessing, using some or all of the login data by the process computing system, the third party webpage;

determining, by the process computing system following an attempt to access the third party webpage, that an error has occurred in retrieving data from the third party webpage;

requesting, of the user through communication by the process computing system with the first computing system, that the user help identify and correct the cause of the error;

generating, by the process computing system, default data associated with a third party webpage, the default data at least indicating the layout of the webpage;

generating, by the process computing system using the default data, a mock-up of the third party webpage, the mock-up of the third party webpage including a reproduction of at least part of the third party webpage;

providing, to the user computer system by the process computing system communicating with the user computer system, the mock-up of the third party webpage as an interactive interface, wherein the interactive interface configured to allows the individual to add, modify, correct, and rearrange the default data;

obtaining, from the interactive interface, additions, modifications, corrections, and/or rearrangements of the default data associated with the third party webpage from the interactive interface, the additions, modifications, corrections, and/or rearrangements of the default data associated with the third party webpage at least including an additions, modifications, corrections, and/or rearrangements of the layout of the webpage;

transforming the additions, modifications, corrections, and/or rearrangements of the default data associated with the third party webpage into correction data;

transforming the correction data into parser scripts associated with the third party webpage; and using the login data and parser scripts associated with the third party webpage to obtain data associated with the individual from the third party webpage.

22. The system for providing a net effect platform for developing and correcting screen scraping scripts of claim 21 wherein the default data associated with the third party webpage includes data indicating the layout of the third party webpage and/or data identifying data fields within the third party webpage.

23. The system for providing a net effect platform for developing and correcting screen scraping scripts of claim 21 wherein the mock-up of the third party webpage is provided to the individual through a data management system.

24. The system for providing a net effect platform for developing and correcting screen scraping scripts of claim 23 wherein the default data associated with the third party webpage is generated using heuristic analysis and data from other individuals using the data management system.

25. The system for providing a net effect platform for developing and correcting screen scraping scripts of claim 21 wherein the mock-up of the third party webpage is provided to the individual through a financial management system.

26. The system for providing a net effect platform for developing and correcting screen scraping scripts of claim 25 wherein the third party webpage is provided by a third party that is a financial institution.

27. The system for providing a net effect platform for developing and correcting screen scraping scripts of claim 21 wherein the mock-up of the third party webpage is a Graphical User Interface (GUI).

28. The system for providing a net effect platform for developing and correcting screen scraping scripts of claim 21 wherein the parser scripts associated with the third party webpage are reviewed or approved before using the login data and parser scripts associated with the third party webpage to obtain data associated with the individual from the third party webpage.

29. The system for providing a net effect platform for developing and correcting screen scraping scripts of claim 21 wherein the parser scripts associated with the third party webpage are reviewed or approved by the individual.

30. The system for providing a net effect platform for developing and correcting screen scraping scripts of claim 21 wherein the parser scripts associated with the third party webpage are reviewed or approved by the provider of the computing system implemented method for providing a net effect platform for developing and correcting screen scraping scripts.

* * * * *